(No Model.)
E. E. HIPP.
ANIMAL RELEASING DEVICE.
No. 366,100. Patented July 5, 1887.
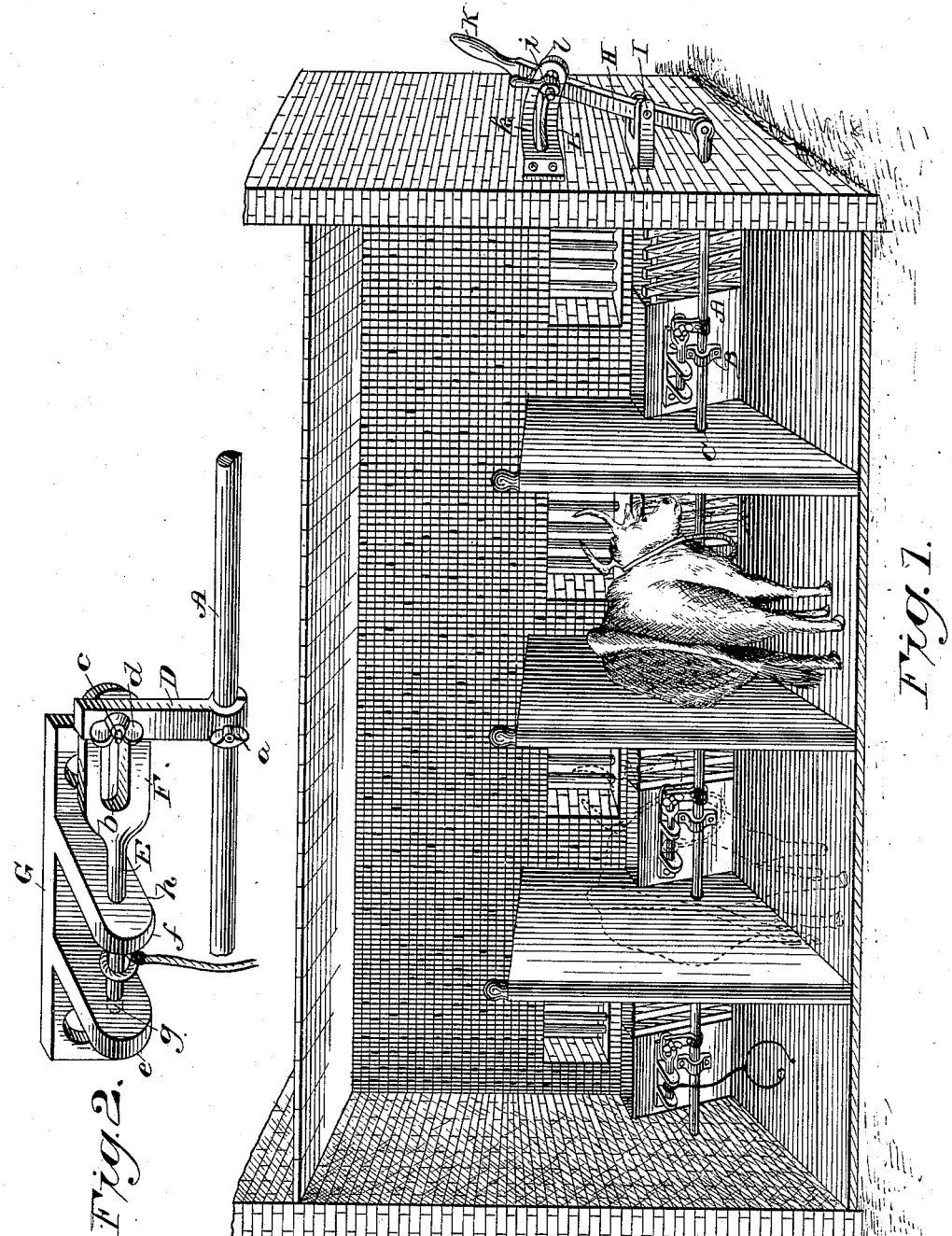

UNITED STATES PATENT OFFICE.

ELMER ELLSWORTH HIPP, OF LEBANON, PENNSYLVANIA.

ANIMAL-RELEASING DEVICE.

SPECIFICATION forming part of Letters Patent No. 366,100, dated July 5, 1887.

Application filed May 17, 1887. Serial No. 238,496. (No model.)

*To all whom it may concern:*

Be it known that I, ELMER ELLSWORTH HIPP, a citizen of the United States, residing at Lebanon, in the county of Lebanon and State of Pennsylvania, have invented certain new and useful Improvements in Animal-Releasing Devices; and I do hereby declare the following to be a full, clear, and exact description of the invention, such as will enable others skilled in the art to which it appertains to make and use the same.

My invention relates to animal-releasing devices, and has for its object the construction of a simple, reliable, and effective device by which animals can be released separately or any desired number in a line of stalls released simultaneously.

The invention has special reference, in its application, to releasing animals in burning stables, and is arranged so that they can be released from the outside of the stable, thus avoiding the danger incident to entering the stalls when the animals are excited by fire; but it is also applicable to general use under ordinary circumstances.

The invention will be hereinafter described, and particularly pointed out in the claims.

In the accompanying drawings, which form a part of this specification, Figure 1 is a perspective illustrating the application of my invention, and Fig. 2 is an enlarged view of one of the devices.

Reference being had to the drawings and the letters marked thereon, A represents a horizontal rod or bar, which may extend across any number of stalls, and is supported in suitable straps, B, secured to the manger, and in the partitions C, which separate the stalls. To the rod A are secured arms D, by means of screws *a;* or they may in some instances be otherwise secured.

E represents a bolt, a part of which is shown cylindrical, and it is provided with an enlarged head, F, having an enlarged slot, *b*, formed therein. The bolt E is adjustably and detachably secured to the arm D by a clamping screw-bolt, *c*, and thumb-nut *d*, the screw *c* passing through the slot *b* and the arm D.

G represents a bracket, which is provided with lugs *e f*, having perforations *g h* near their outer ends, to receive the cylindrical portion of the bolt E, and is secured to the manger in any suitable manner.

One end of the halter, rope, or other hitching device is provided with a loop, eye, or ring, which is placed upon the bolt E, for securing animals in their stalls.

To the outer end of the rod A is pivotally attached a lever, H, which is fulcrumed at I and provided with a handle, K, and a pin or stud, *i*, which works in a slot, *k*, in the bracket L, and a nut, *l*, for securely locking the releasing device, to prevent the animals from releasing themselves from their stalls and wandering about the stable and annoying other animals or committing other depredations.

When it is desired to release any one animal without releasing any others in the line of stalls, the clamping nut *d* of the device securing the animals is slackened and the bolt E moved back out of engagement with the lug *e* of the bracket G, when the loop, eye, or ring in the end of the hitching device will fall off the bolt.

It is frequently desirable to keep one or more animals in their stalls while all others in the line of stalls are permitted to leave them. Under such circumstances it is only necessary to slacken the clamping-nuts *d* on their securing devices, when the bar A may be operated by the lever H, and all the animals released except those intended to remain in their stalls.

Heretofore it has been proposed to provide the horizontally-moving bar with locking bolts or pins detachably secured thereto.

In the event of a fire in the stable, all of the animals may be released from outside of the stable by the use of the lever H.

Having thus fully described my invention, what I claim, and desire to secure by Letters Patent, is—

1. In combination with the operating bar and brackets of a releasing device, the projecting arms, the bolts having slotted heads, and means for securing said bolts to the arms, substantially as described.

2. In an animal-releasing device, the combination of a horizontal bar provided with one or more projecting arms, an operating-lever, a slotted guide and a locking device for said lever, a sliding bolt having an elongated slot in one end and secured to an arm on the operating-bar by a clamping bolt and nut, and a bracket provided with perforated lugs, substantially as described.

In testimony whereof I affix my signature in presence of two witnesses.

ELMER ELLSWORTH HIPP.

Witnesses:
  ALFRED H. DESH,
  TOBIAS REINOEHL.